US012650767B2

(12) United States Patent
Sung et al.

(10) Patent No.: US 12,650,767 B2
(45) Date of Patent: Jun. 9, 2026

(54) DATA RECEIVING METHOD AND DATA RECEIVING DEVICE

(71) Applicant: Realtek Semiconductor Corp., HsinChu (TW)

(72) Inventors: Lien-Hsiang Sung, HsinChu (TW); Wun-Lin Chang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 18/625,147

(22) Filed: Apr. 2, 2024

(65) Prior Publication Data

US 2024/0345724 A1      Oct. 17, 2024

(30) Foreign Application Priority Data

Apr. 12, 2023    (TW) ................................. 112113613

(51) Int. Cl.
*G06F 3/06*           (2006.01)
(52) U.S. Cl.
CPC .......... *G06F 3/0604* (2013.01); *G06F 3/0655* (2013.01); *G06F 3/0679* (2013.01)
(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20;
(Continued)

(56) References Cited

U.S. PATENT DOCUMENTS

| | | | | |
|---|---|---|---|---|
| 6,684,263 | B2 * | 1/2004 | Horowitz | .............. G06F 3/0658 |
| | | | | 710/104 |
| 10,170,170 | B2 * | 1/2019 | Ware | ................... G06F 13/4234 |

(Continued)

FOREIGN PATENT DOCUMENTS

| | | |
|---|---|---|
| TW | 1749888 B | 12/2021 |

OTHER PUBLICATIONS

A. F. Zey, "Networking digital transmitters," Forty-Second Annual Conference of Electrical Engineering Problems in the Rubber and Plastics Industries, Akron, OH, USA, 1990, pp. 53-56, doi: 10.1109/RAPCON.1990.66469. (Year: 1990).*

*Primary Examiner* — Daniel C. Chappell
(74) *Attorney, Agent, or Firm* — Winston Hsu

(57)           ABSTRACT

A data receiving method, applied to a first electronic device and a second electronic device, comprising: (a) generating a plurality of counting values via a counter circuit; (b) receiving alignment data stored in the second electronic device by the first electronic device; (c) sampling the alignment data by a sampler circuit in the first electronic device to generate a plurality of sampling values; (d) deciding a sampling point and a sampling period of the sampler circuit according to the sampling values and the counting values; and (e) sampling other data transmitted by the second electronic device by the sampler circuit according to the sampling point and the sampling period.

18 Claims, 5 Drawing Sheets

(58) Field of Classification Search
CPC ........ G06F 2209/00–549; G06F 2211/00–902;
G06F 2212/00–7211; G06F
2213/00–4004; G06F 2216/00–17; G06F
2221/00–2153; G06N 3/00–126; G06N
5/00–048; G06N 7/00–08; G06N 10/00;
G06N 20/00–20; G06N 99/00–007; G06T
1/00–60; G06V 30/00–43; G11B
20/00–24; G11B 33/00–1493; G11C
11/00–5692; G11C 13/00–06; G11C
14/00–009; G11C 15/00–06; G11C
16/00–3495; G11C 17/00–18; G11C
2207/00–229; G11C 2216/00–30; H01L
25/00–50; H01L 2225/00–1094; H03M
7/00–707; H04L 9/00–38; H04L
12/00–66; H04L 41/00–5096; H04L
49/00–9094; H04L 61/00–59; H04L
67/00–75
See application file for complete search history.

(56)                    References Cited

U.S. PATENT DOCUMENTS

| | | | | |
|---|---|---|---|---|
| 10,627,851 | B2 * | 4/2020 | Chen ......................... | G06F 1/08 |
| 10,725,913 | B2 * | 7/2020 | Hasbun ............... | G06F 12/0806 |
| 2005/0219919 | A1 * | 10/2005 | Ivanov ................... | G11C 16/32 |
| | | | | 365/194 |

* cited by examiner

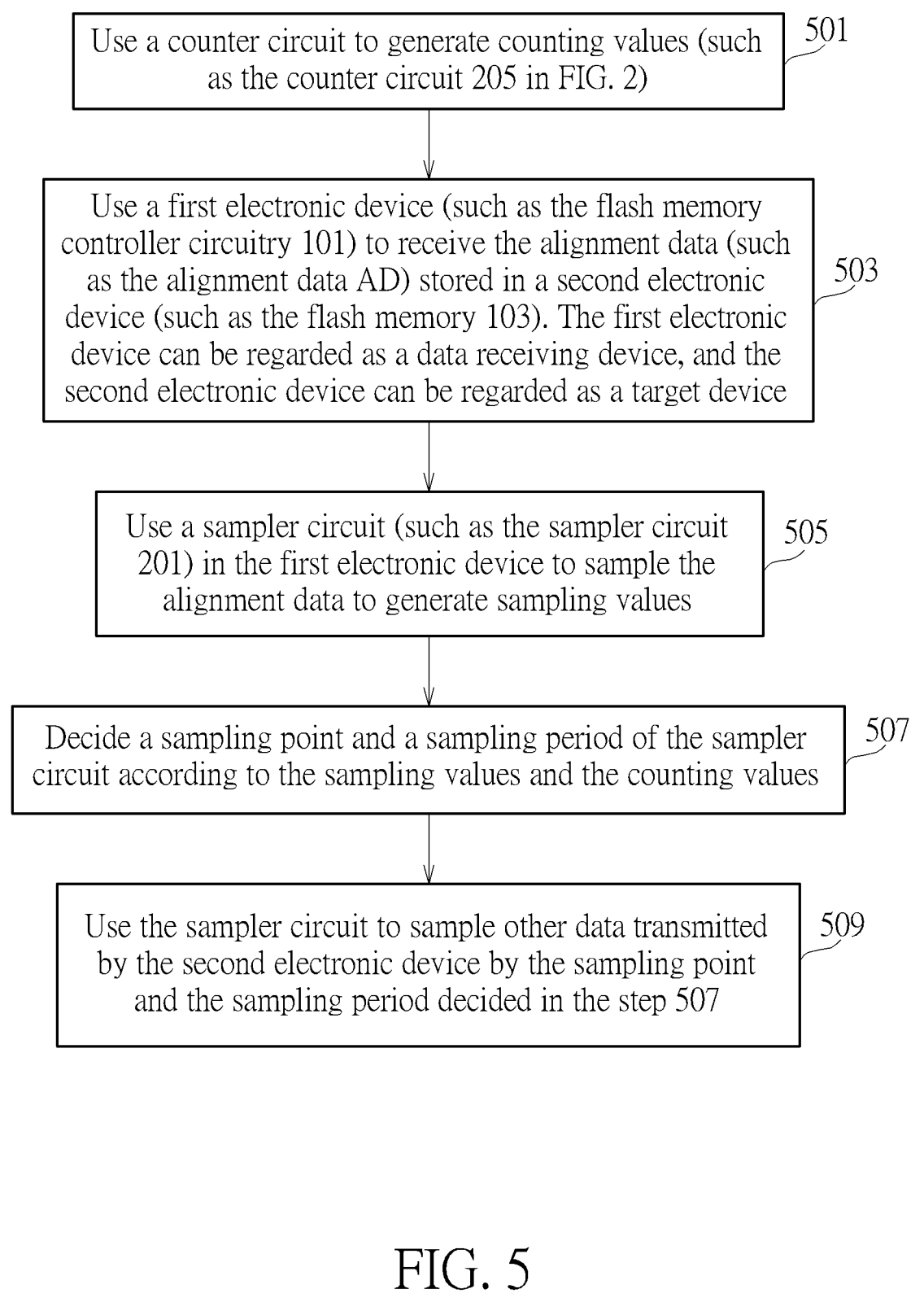

Use a counter circuit to generate counting values (such as the counter circuit 205 in FIG. 2)    501

Use a first electronic device (such as the flash memory controller circuitry 101) to receive the alignment data (such as the alignment data AD) stored in a second electronic device (such as the flash memory 103). The first electronic device can be regarded as a data receiving device, and the second electronic device can be regarded as a target device    503

Use a sampler circuit (such as the sampler circuit 201) in the first electronic device to sample the alignment data to generate sampling values    505

Decide a sampling point and a sampling period of the sampler circuit according to the sampling values and the counting values    507

Use the sampler circuit to sample other data transmitted by the second electronic device by the sampling point and the sampling period decided in the step 507    509

FIG. 5

DATA RECEIVING METHOD AND DATA RECEIVING DEVICE

BACKGROUND OF THE INVENTION

1. Field of the Invention

The present invention relates to a data receiving method and a data deceiving device, and particularly relates to a data receiving method and a data deceiving device which can automatically sets a clock signal frequency to compensate signal delays.

2. Description of the Prior Art

In recent years, flash memories are well known devices. However, data request commands and data may be delayed during transmission due to various factors. Accordingly, the circuit design is limited and it is hard to select a proper sampling clock signal.

Accordingly, a new data receiving method is needed to improve such problems.

SUMMARY OF THE INVENTION

One objective of the present invention is to provide a data receiving method which can compensate signal delay.

Another objective of the present invention is to provide a data receiving device which can compensate signal delay.

One embodiment of the present invention discloses a data receiving method, applied to a first electronic device and a second electronic device, comprising: (a) generating a plurality of counting values via a counter circuit; (b) receiving alignment data stored in the second electronic device by the first electronic device; (c) sampling the alignment data by a sampler circuit in the first electronic device to generate a plurality of sampling values; (d) deciding a sampling point and a sampling period of the sampler circuit according to the sampling values and the counting values; and (e) sampling other data transmitted by the second electronic device by the sampler circuit according to the sampling point and the sampling period.

Another embodiment of the present invention discloses a data receiving device, for receiving data from a target device, comprising: a counter circuit, configured to generate a plurality of counting values; a sampler circuit, configured to receive alignment data stored in the target device and to sample the alignment data to generate a plurality of sampling values; and a decider circuit, configured to decide a sampling point and a sampling period of the sampler circuit according to the sampling values and the counting values; and wherein the data receiving device uses the sampler circuit to sample other data transmitted by the target device according to the sampling point and the sampling period after the decider circuit decides the sampling point and the sampling period.

In view of above-mentioned embodiments, no matter what the delay value between the flash memory controller circuitry and the flash memory is, the signal delay can be compensated by setting a better sampling point and a better sampling period, there by the data can be more accurately received.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a flow chart illustrating a data receiving method according to one embodiment of the present invention.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Additionally, the term "first", "second", "third" in following descriptions are only for the purpose of distinguishing different components, and do not mean the sequence of the components. For example, a first device and a second device only mean these devices can have the same structure but are different devices.

Figure 1:
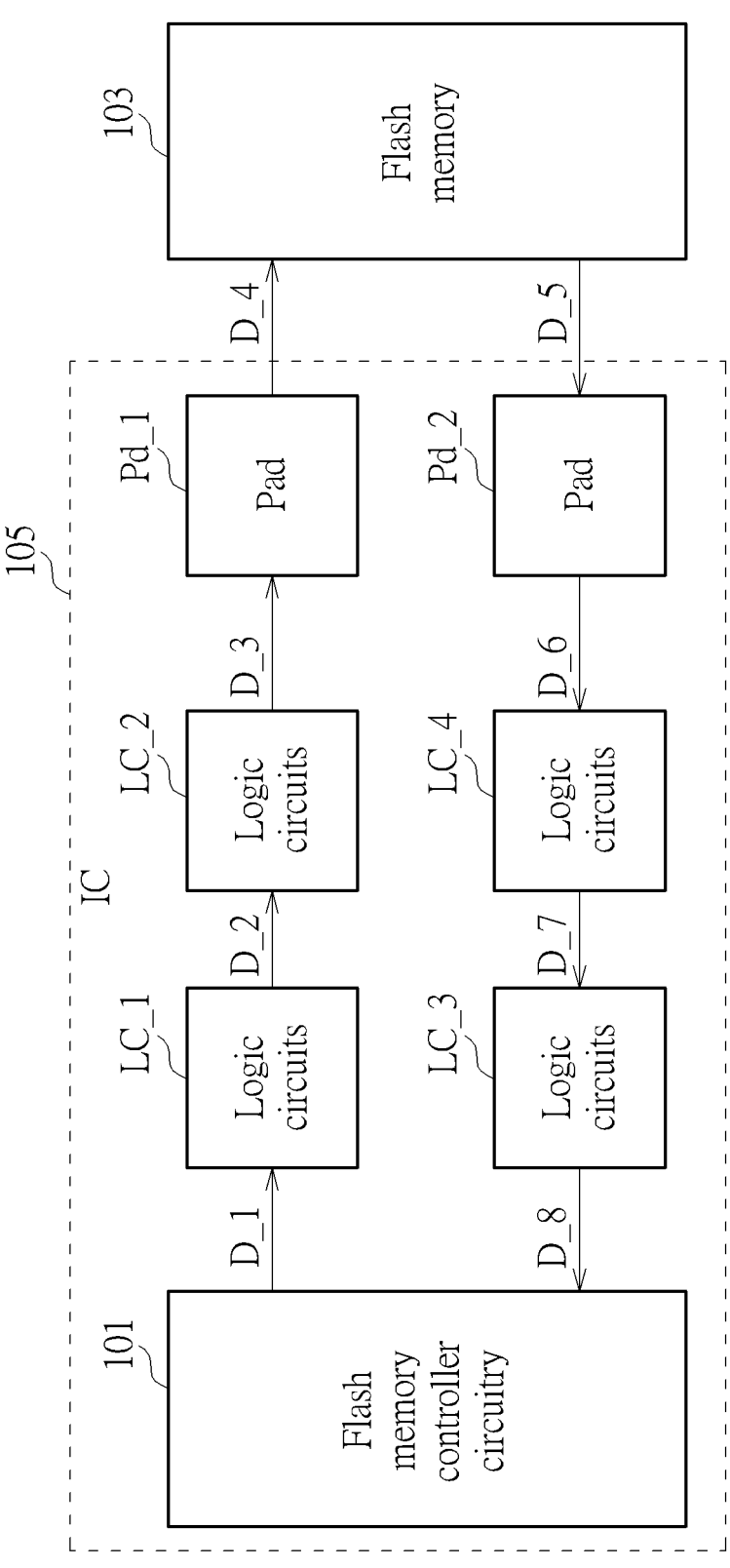
FIG. 1 is a block diagram illustrating a flash memory controller circuitry and a flash memory according to one embodiment of the present invention.

FIG. 1 is a block diagram illustrating a flash memory controller circuitry and a flash memory according to one embodiment of the present invention. Please also note that the number and arrangement of components shown in FIG. 1 are for illustration only, and does not mean to limit the scope of the present invention. In the embodiment of FIG. 1, when the flash memory controller circuitry 101 needs to receive data from the flash memory 103, the flash memory controller circuitry 101 first send a data request command to the flash memory 103, and then the flash memory 103 sends data to the flash memory controller circuitry 101 in response to the data request command. After receiving the data, the flash memory controller circuitry 101 samples the data. However, the transmission of the data request command and the transmission of the data may be delayed, thus causing difficulties in sampling.

Take FIG. 1 as an example, in one embodiment, the flash memory controller circuitry 101 is located in an IC (Integrated Circuit) 105, and the IC 105 further comprises logic circuits LC_1, LC_2, LC_3, LC_4 and pads Pd_1, Pd_2. The logic circuits LC_1, LC_2, LC_3, and LC_4 are respectively serially connected between the pad Pd_1 and the flash memory controller circuitry 101, and between the pad Pd_2 and the flash memory controller circuitry 101, thus causing delays D_1, D_2, D_3, D_6, D_7, D_8. In addition, the pads Pd_1, Pd_2 and the flash memory 103 cause delays D_4 and D_5 respectively, and the flash memory 105 itself also cause delays. The aforementioned delay may be different due to the layout of the circuit, the number of logic circuits, or the structure of the flash memory itself. This makes the difficult for the flash memory controller circuitry 101 to select a frequency of the sampling clock signal for sampling when sampling. The overall delay nay be calculated before the IC leaves the factory and the frequency of the sampling clock signal is set accordingly, such overall delay is supposed to be fixed and cannot be changed. However, the delay may change due to circuit aging or other factors in the future, or the flash memory 101 may be changed, thus causes a lot of inconvenience for design. Therefore, the present invention provides a compensation mechanism in the following embodiments to automatically detect the amount of delay and correspondingly set a more appropriate sampling point and sampling period, that is, to set the frequency of the sampling clock signal.

Figure 2:
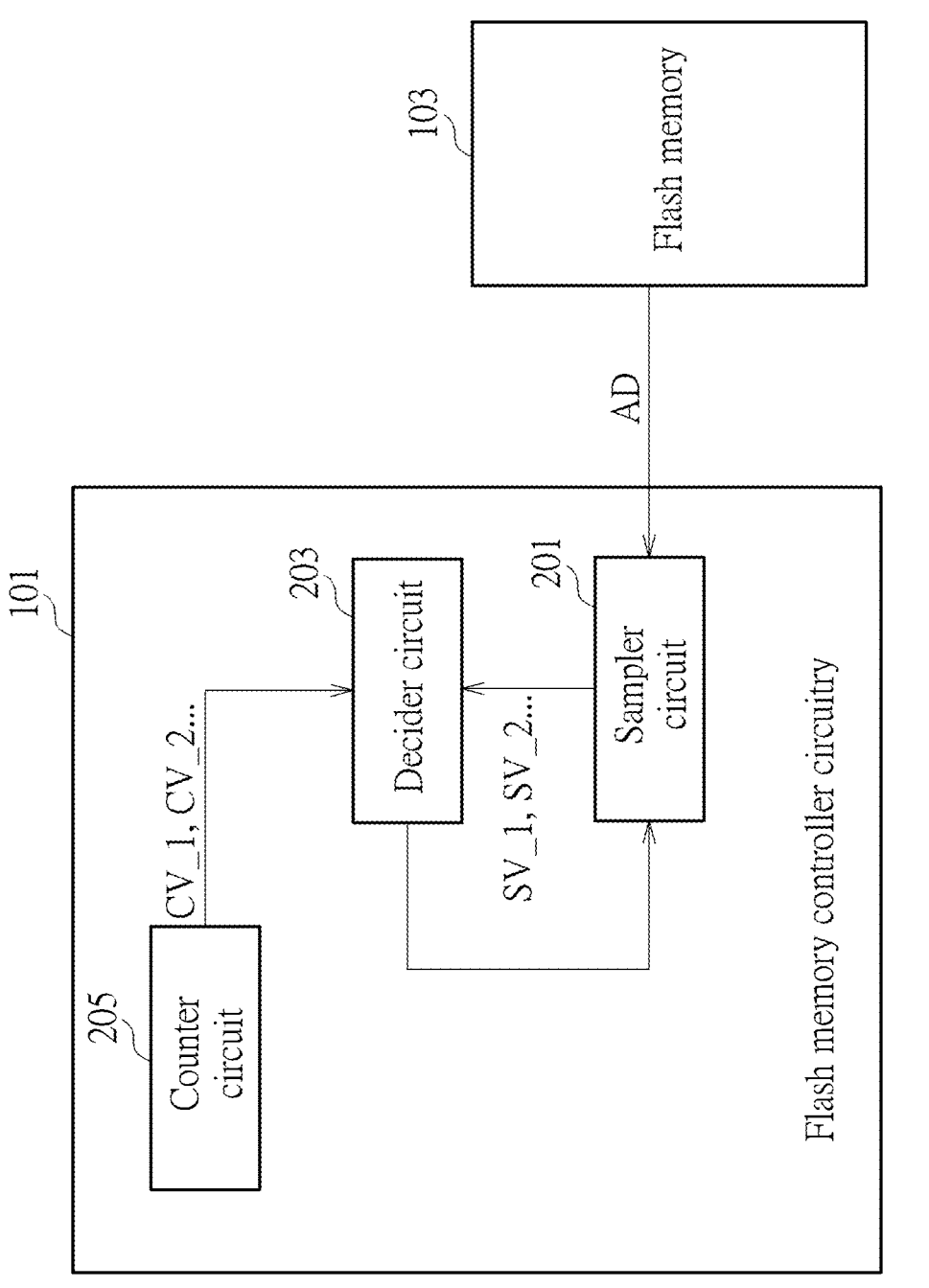
FIG. 2 is a block diagram illustrating a detail structure of a flash controller according to one embodiment of the present invention.

FIG. 2 is a block diagram illustrating a detail structure of a flash controller according to one embodiment of the present invention. As shown in FIG. 2, the flash memory controller circuitry 101 comprises a sampler circuit 201, a decider circuit 203 and a counter circuit 205. The sampler circuit 201, the decider circuit 203 or the counter circuit 205 can be implemented by writing programs in the flash memory controller circuitry 101, but they can also be independent circuits. In addition, the decider circuit 203 or the counter circuit 205 can also be disposed outside the flash memory controller circuitry 101, rather than limited to be disposed within the flash memory controller circuitry 101.

In the embodiment shown in FIG. 2, the flash memory 103 stores alignment data AD. In one embodiment, the alignment data AD is N-bit data, and is stored in the starting N-bits of the flash memory 103, where N is a positive integer greater than or equal to 2. For example, if the alignment data AD is 8-bit data, it is stored in the first bit to the eighth bit of the flash memory 103. When setting the sampling clock signal, the counter circuit 205 continuously generate counting values CV_1, CV_2 . . . . The flash memory controller circuitry 101 receives the alignment data AD, and then the sampler circuit 201 samples the alignment data AD to generate sampling values SV_1, SV_2 . . . . The decider circuit 203 decides a sampling point and a sampling period of the sampler circuit 201 according to the sampling values SV_1, SV_2 . . . and the counting values CV_1, CV_2 . . . . After the sampling point and sampling period are decided, the sampler circuit 201 samples other data transmitted by the flash memory controller circuitry 101 by the sampling point and the sampling period decided by the decider circuit 203. However, the alignment data AD is not limited to be stored to the starting N bits in the flash memory 103, and it can also be stored in the flash memory 103 in other ways. For example, the alignment data AD can be stored in the flash memory 103 periodically, such as 12-19 bits, 24-31 bits. As long as the flash memory controller circuitry 101 obtains the location where the alignment data AD is stored in advance or can determine that it has received the alignment data AD, the flash memory controller circuitry 101 can operate normally.

Figure 3:
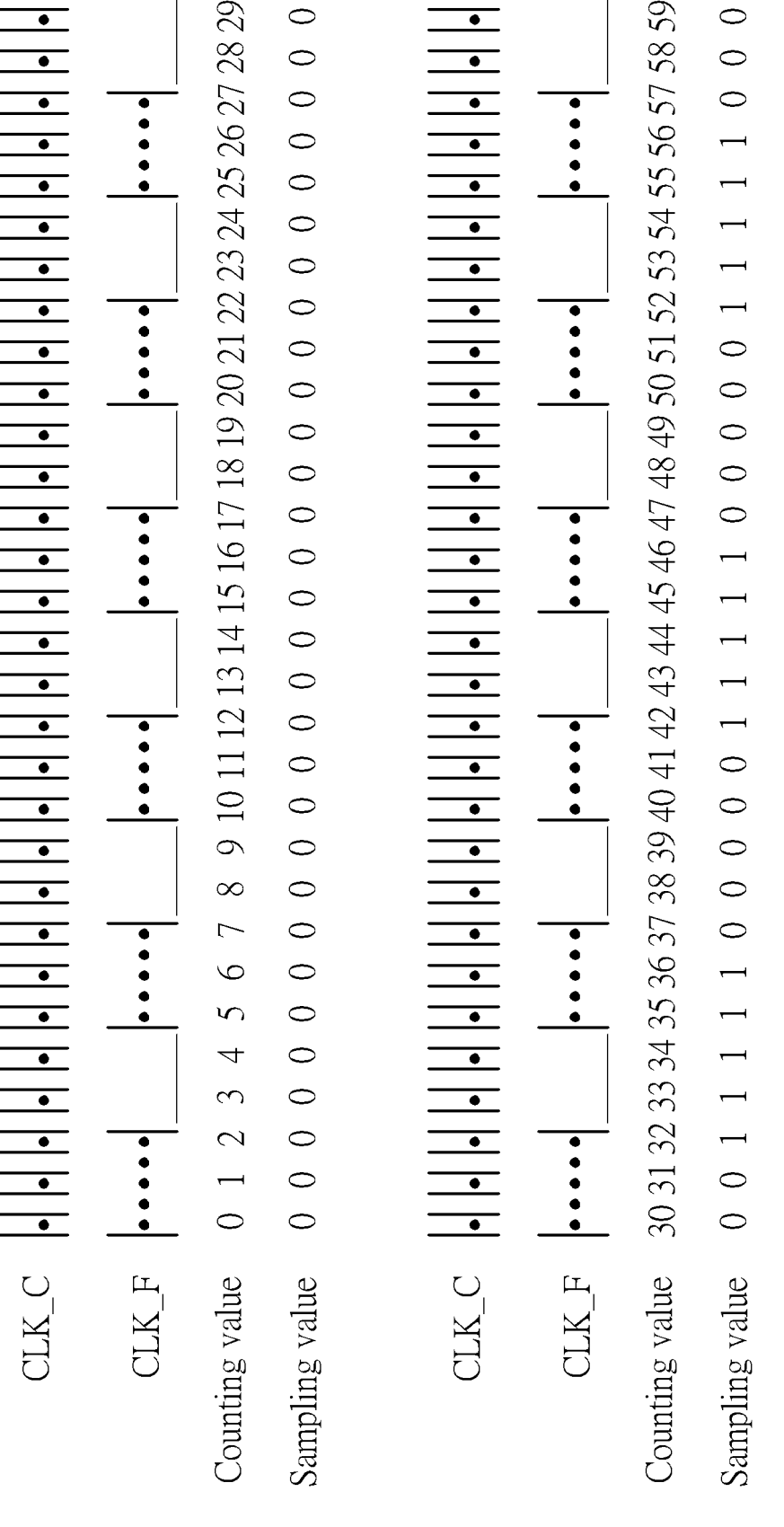
FIG. 3 and FIG. 4 are schematic diagrams illustrating flash memory controller circuitries according to different embodiments of the present invention.
Figure 4:
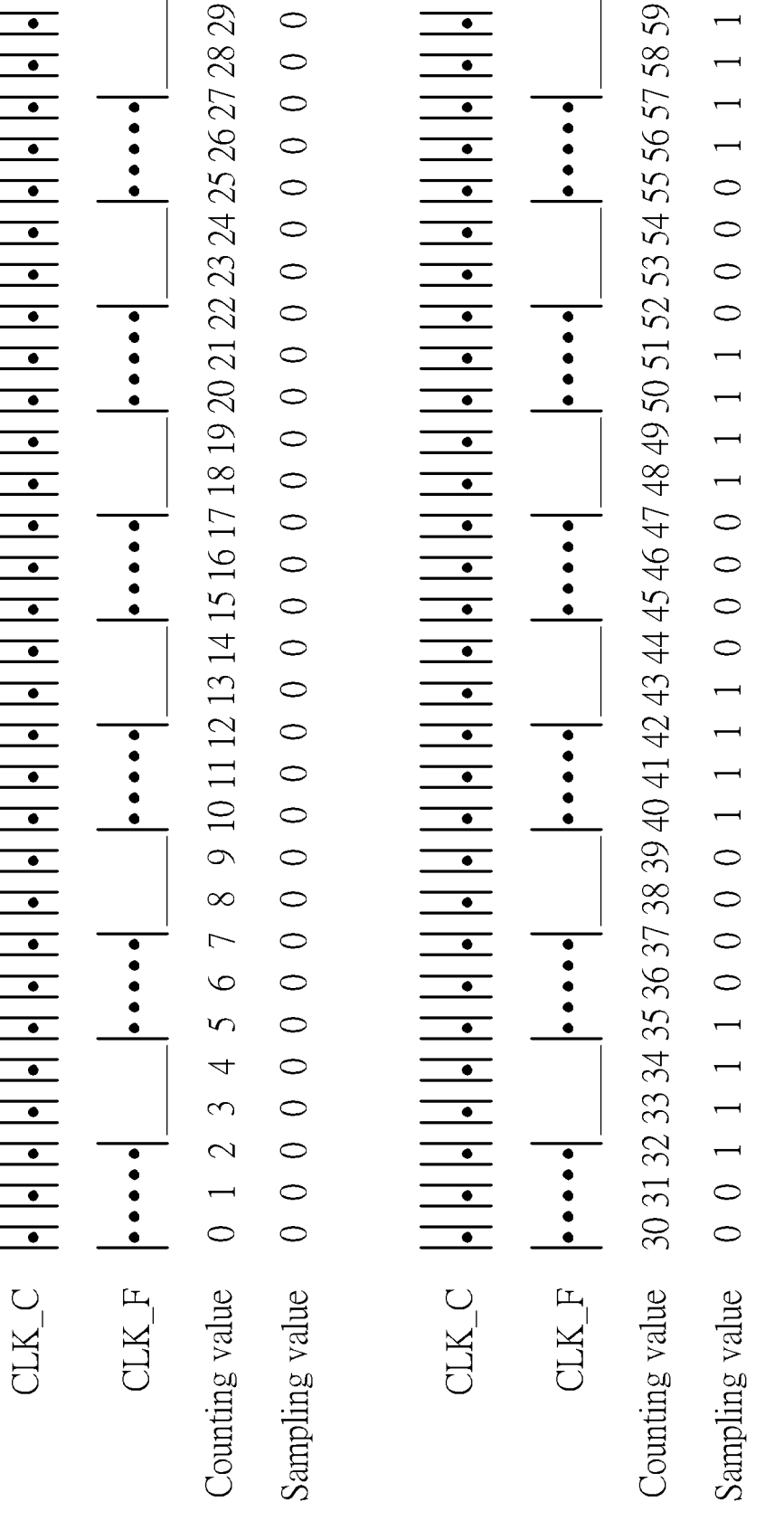

The following descriptions describe how to decide the sampling point and the sampling period according to the sampling values SV_1, SV_2 . . . and the counting values CV_1, CV_2 . . . . However, please note that the following descriptions are for example only, and do not mean to limit the scope of the present invention. FIG. 3 and FIG. 4 are schematic diagrams illustrating flash memory controller circuitries according to different embodiments of the present invention. In the embodiment of FIG. 3, the signal CLK_C is the clock signal used by the flash memory controller circuitry 101, and the signal CLK_F is the clock signal used by the flash memory controller circuitry 101. In the embodiment shown in FIG. 3, the frequency of the signal CLK_C is five times of the frequency of the signal CLK_F, but does not mean to limit the scope of the present invention. The signal CLK_C is used as a sampling clock signal in the embodiment of FIG. 3.

In the embodiment in FIG. 3, the alignment data AD is 8-bit data 01010101 with different logic values. When the flash memory controller circuitry 101 sends a data receiving command to the flash memory 103 or after sending the data receiving command, the counter circuit 205 starts counting. Wherein, when the counting value is 0 to 31, since the flash memory controller circuitry 101 does not received any data, the sampling value is 0 or other meaningless values. When the counter circuit counts to 27, the flash memory controller circuitry 101 starts to receive the alignment data AD. When the counting value is 27 to 31, the sampler circuit 201 samples the first bit 0 of the alignment data AD, but since the sample value is also 0 when no data is received in the example in FIG. 3, it cannot be determined whether the alignment data AD is received or not. When the counting value is 32 to 36, the sampler circuit 201 samples the second bit 1 in the alignment data AD, and when the counting value is 37 to 41, the sampler circuit 201 samples the third bit 0 in the alignment data AD.

According to such distribution, the middle time of the first group of continuous identical sampling values can be used as the sampling point, and then the sampling period is calculated according to this sampling point and the middle time of the next group of continuous identical sampling values. Taking the embodiment in FIG. 3 as an example, when the counting value is 32 to 36, the first group of identifiable continuous sampling values 1 are obtained, and the middle time is the time of the counting value 34. Therefore, the time of the counting value 34 can be used as the sampling point. When the counting value is 37 to 41, the second group of continuous sampling value 0 is obtained, and the middle time is the time of the counting value 39, so the sampling period can be calculated by the sampling point and the time of the counting value is 39. In the example of FIG. 3, since the difference between the counting value 34 and the counting value 39 is five times of the time period of the signal CLK_C, thus the sampling period is five time periods of the signal CLK_C.

In the embodiment of FIG. 3, the number of continuous identical sampling values is an odd number (5), but the example shown in FIG. 3 can also be used in the case where the number of continuous identical sampling values is an even number. In the example in FIG. 4, when the counting value is 0 to 31, since the flash memory controller circuitry 101 does not receive any data, the sampling value is 0 or other meaningless values. When the counter circuit counts to 28, the flash memory controller circuitry 101 starts to receive the alignment data AD. When the counting value is 28 to 31, the first bit 0 of the alignment data AD is sampled, but since the sampling value is also 0 when no data is received in the example in FIG. 4, it cannot be determined whether the alignment data AD is received or not. When the counting value is 32 to 35, the sampler circuit 201 samples the second bit 1 in the alignment data AD, and when the counting value is 36 to 39, the sampler circuit 201 samples the third bit 0 in the alignment data AD. According to such distribution, similar with FIG. 3, the middle time of the identifiable first group of continuous identical sampling values can be used as the sampling point, and then the sampling period is calculated based on this sampling point and the middle time of the next group of continuous identical sampling values.

However, in the embodiment in FIG. 4, since the number of continuous identical sampling values is an even number (4), there are two times in the middle time. In such case, any one of the middle times may be used to calculate the sampling point and sampling period. In detail, taking the embodiment in FIG. 3 as an example, when the counting value is 32 to 35, the first group of continuous sampling values 1 are obtained, and the middle time is the time for the counting value 33 or 34. Therefore, the time when the counting value is 33 or 34 can be used as the sampling point. When the counting value is 36 to 39, the second group of continuous sampling value 0 is obtained, and the middle time is the time for the counting value 37 or 38, so the sampling period can be calculated according to the sampling point and the time for the counting value 37 or 38. In one embodiment, if it is detected that the number of continuous sampling values is an even number, the flash memory controller circuitry 101 can adjust the speed of the counter circuit so that the sampling point and sampling period are decided when the number of continuous sampling values is an odd number.

The examples in FIG. 3 and FIG. 4 can be summarized as follows:

The sampling point is decided according to a first sampling time of at least one middle first sampling value, and the sampling period is decided according to a time difference between the first sampling time and a second sampling time of at least one middle second sampling time, if the sampling values comprises continuous first sampling values with a first logic value (e.g., the sampling values 1 for the counting values 32-36 in FIG. 3) and comprises continuous second sampling values with a second logic value (e.g., the sampling values 0 for the counting values 37-41 in FIG. 3). The middle first sampling values are the first sampling values which have middle sampling times among sampling times of the first sampling values. Also, the middle second sampling values are the second sampling values which have middle sampling times among sampling times the second sampling values. For the example in FIG. 3, the middle first sampling value is the sampling value 1 for the counting value 34, and the middle second sampling value is the sampling value 0 for the counting value 39. For the example in FIG. 4, the middle first sampling value is the sampling value 1 for the counting value 33 or 34, and the middle second sampling value is the sampling value 0 for the counting value 37 or 38.

The above-mentioned operation of setting the sampling clock signal can be automatically performed by the flash memory controller circuitry 101 after the flash memory controller circuitry 101 switches from non-active to active and before any accessing to the flash memory 103 is executed. As above-mentioned, the flash memory controller circuitry 101 can be disposed in an IC 105. In such case, when the IC 105 is switched from unpowered (not receiving power) to powered (receive power), the flash memory controller circuitry 101 is switched from non-active to active, and automatically executes the aforementioned steps for setting the sampling clock signal. In another embodiment, both the flash memory controller circuitry 101 and the flash memory 103 are located in an electronic system. The electronic system can be any electronic device, such as a computer, a mobile phone, or a wearable device. In this case, the above-mentioned action of setting the sampling clock signal can be automatically performed after the electronic system is switched from turning off to turning on and before any accessing to the flash memory 103 is performed by the electronic system. However, the above-mentioned operation of setting the sampling clock signal can also be performed periodically or non-periodically, so as to ensure the accuracy of data access. Alternatively, the flash memory controller circuitry 101 may automatically perform the operation of setting the sampling clock signal after the flash memory controller circuitry 101 receives a test command.

Although the above-mentioned embodiments use the flash memory controller circuitry 101 and the flash memory 103 for explaining, they can also be replaced by other electronic devices. Therefore, according to the above-mentioned embodiments, a data receiving method shown in FIG. 5 can be obtained, which comprises the following steps.

Step 501
Use a counter circuit to generate counting values (such as the counter circuit 205 in FIG. 2).

Step 503
Use a first electronic device (such as the flash memory controller circuitry 101) to receive the alignment data (such as the alignment data AD) stored in a second electronic device (such as the flash memory 103). The first electronic device can be regarded as a data receiving device, and the second electronic device can be regarded as a target device.

Step 505
Use a sampler circuit (such as the sampler circuit 201) in the first electronic device to sample the alignment data to generate sampling values.

Step 507
Decide a sampling point and a sampling period of the sampler circuit according to the sampling values and the counting values.

Step 509
Use the sampler circuit to sample other data transmitted by the second electronic device by the sampling point and the sampling period decided in the step 507.

In view of above-mentioned embodiments, no matter what the delay value between the flash memory controller circuitry and the flash memory is, the signal delay can be compensated by setting a better sampling point and a better sampling period, there by the data can be more accurately received.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A data receiving method, applied to a first electronic device and a second electronic device comprising:
   a) generating a plurality of counting values via a counter circuit;
   b) receiving alignment data stored in the second electronic device by the first electronic device, wherein the second electronic device is a memory;
   c) sampling the alignment data by a sampler circuit in the first electronic device to generate a plurality of sampling values;
   d) adjusting a sampling point and a sampling period of the sampler circuit according to the plurality of sampling values and the plurality of counting values, wherein the plurality of counting values are used for determining the sampling point and the sampling period, wherein the plurality of sampling values are used for determining whether the sampler circuit receives the alignment data or not and used for determining the sampling point and the sampling period; and
   e) sampling other data transmitted by the second electronic device by the sampler circuit according to the sampling point and the sampling period;
wherein the alignment data is N-bit data stored in advance, wherein the alignment data is stored in first N bits of the second electronic device, or periodically stored in other bits of the second electronic device.

2. The data receiving method of claim 1, wherein the first electronic device is in an IC, and the counter circuit is provided in the IC.

3. The data receiving method of claim 2, wherein the first electronic device is a flash memory controller circuitry, and the second electronic device is a flash memory.

4. The data receiving method of claim 1, wherein the step of (d) adjusts the sampling point according to a first sampling time of at least one middle first sampling value of the plurality of sampling values, and decides the sampling period according to a time difference between the first sampling time and a second sampling time of at least one middle second sampling time, if the plurality of sampling values comprises continuous first sampling values with a first logic value and comprises continuous second sampling values with a second logic value; wherein the middle first sampling values are the first sampling values of the plurality of sampling values which have middle sampling times among sampling times of the first sampling values; wherein the middle second sampling values are the second sampling values of the plurality of sampling values which have middle sampling times among sampling times of the second sampling values.

5. The data receiving method of claim 1, wherein the alignment data is bits data with a plurality of logic values.

6. The data receiving method of claim 5, wherein the alignment data is data with the logic values of 1 and 0.

7. The data receiving method of claim 6, wherein the alignment data is 01010101.

8. The data receiving method of claim 1, wherein the step (a), the step (b), the step (c), the step (d) and the step (e) are performed after the first electronic device switches from non-active to active and before the first electronic device performs any accessing to the second electronic device.

9. The data receiving method of claim 1, wherein the first electronic device and the second electronic device are provided in an electronic system, wherein the step (a), the step (b), the step (c), the step (d) and the step (e) are performed after the electronic system switches from turning off to turning on and before the electronic system performs any accessing to the second electronic device.

10. A data receiving device, for receiving data from a target device, comprising:

a counter circuit, configured to generate a plurality of counting values;

a sampler circuit, configured to receive alignment data stored in the target device and to sample the alignment data to generate a plurality of sampling values, wherein the target device is a memory; and a decider circuit, configured to adjust a sampling point and a sampling period of the sampler circuit according to the plurality of sampling values and the plurality of counting values, wherein the plurality of counting values are used for determining the sampling point and the sampling period, wherein the plurality of sampling values are used for determining whether the sampler circuit receives the alignment data or not and are used for determining the sampling point and the sampling period; and wherein the data receiving device uses the sampler circuit to sample the data transmitted by the target device according to the sampling point and the sampling period after the decider circuit generates the sampling point and the sampling period;

wherein the alignment data is N-bit data stored in advance, wherein the alignment data is stored in first N bits of the target device, or periodically stored in other bits of the target device.

11. The data receiving device of claim 10, wherein the data receiving device is in an IC, and the counter circuit is provided in the IC.

12. The data receiving device of claim 11, wherein the data receiving device is a flash memory controller circuitry, and the target device is a flash memory.

13. The data receiving device of claim 10, wherein the decider circuit adjusts the sampling point according to a first sampling time of at least one middle first sampling value, and generates the sampling period according to a time difference between the first sampling time and a second sampling time of at least one middle second sampling time, if the plurality of sampling values comprises continuous first sampling values with a first logic value and comprises continuous second sampling values with a second logic value; wherein the middle first sampling values are the first sampling values of the plurality of sampling values which have middle sampling times among sampling times of the first sampling values; wherein the middle second sampling values are the second sampling values of the plurality of sampling values which have middle sampling times among the sampling times of the second sampling values.

14. The data receiving device of claim 10, wherein the alignment data is bits data with a plurality of logic values.

15. The data receiving device of claim 14, wherein the alignment data is data with the logic values of 1 and 0.

16. The data receiving device of claim 15, wherein the alignment data is 01010101.

17. The data receiving device of claim 10, wherein the sampling point and the sampling period are set after the data receiving device switches from non-active to active and before the data receiving device performs any accessing to the target device.

18. The data receiving device of claim 10, wherein the data receiving device and the target device are provided in an electronic system, the sampling point and the sampling period are set after the electronic system switches from turning off to turning on and before the electronic system performs any accessing to the target device.

\* \* \* \* \*